United States Patent [19]

Merianos et al.

[11] Patent Number: 5,159,033
[45] Date of Patent: Oct. 27, 1992

[54] POLYMERIZATION PROCESS USING PVP-$H_2O_2$ AS FREE RADICAL INITIATOR

[75] Inventors: John J. Merianos, Middletown; Robert B. Login, Oakland; Stephen L. Kopolow, Plainsboro, all of N.J.; Mohammed Tazi, Marietta, Ga.

[73] Assignee: ISP Investments Inc., Wilmington, Del.

[21] Appl. No.: 820,820

[22] Filed: Jan. 15, 1992

[51] Int. Cl.$^5$ .............................................. C08F 2/06
[52] U.S. Cl. .................... 526/201; 526/264; 526/271
[58] Field of Search .................... 526/201, 264, 271

[56] References Cited

U.S. PATENT DOCUMENTS 2,789,099  4/1957  Rife et al. ............................ 526/123
3,480,557  11/1969  Shiraeff ............................... 525/387

Primary Examiner—Joseph L. Schofer
Assistant Examiner—Alex H. Walker
Attorney, Agent, or Firm—Walter Katz; Marilyn J. Maue; Joshua J. Ward

[57] ABSTRACT

A process is described for carrying out aqueous and non-aqueous polymerization of polymerizable monomers, particularly vinyl monomers, and, preferably, vinylpyrrolidone, in the presence of a mixture of a stable, high purity, free-flowing, fine white powder of a substantially anhydrous 1:1 molar ratio complex of polyvinylpyrrolidone-hydrogen peroxide (PVP—$H_2O_2$), respectively, and a transition metallic ion, as a free radical initiator, is described herein. Preferred polymerizations are the homopolymerization of vinylpyrrolidone and the copolymerization of maleic anhydride and a $C_1$-$C_5$ alkyl vinyl ether.

2 Claims, No Drawings

POLYMERIZATION PROCESS USING PVP-$H_2O_2$ AS FREE RADICAL INITIATOR

BACKGROUND OF THE INVENTION

1. Field of the Invention

This invention relates to a process for making polymers, and, more particularly, to a polymerization process using a mixture of free-flowing PVP-$H_2O_2$ powder and a transition metal ion as the free radical initiator.

2. Description of the Prior Art

Free radical initiators used in polymerization processes at elevated temperatures have included alkyl peresters, dialkyl peroxides, perketals, peroxydicarbonates, hydroperoxides, peroxides, azo compounds and carbon-carbon labile compounds. Copolymerization also has been carried out at relatively low temperatures, e.g. room temperature, using a redox catalyst, such as, a combination of a redox catalyst and ascorbic acid, or, of a peroxydicarbonate and benzoin. It has been possible also to employ the polymerization initiator conjointly with a suitable accelerator, for example, an amine derived from a cyclic or phenyl structure, the amine being used by itself or together with an organic compound of a transition metal. Copolymerization also has been carried out with a mixture of different polymerization initiators having different decomposition temperatures.

The following compounds have been employed in free radical initiated polymerizations: acetyl cyclohexanesulfonyl peroxide, diacetyl peroxydicarbonate, dicyclohexyl peroxydicarbonate, di-2-ethylhexyl peroxydicarbonate, tert-butyl per [oxy]-neodecanoate, 2,2'-azobis(4-methoxy-2,4-dimethylvaleronitrile); tert-butylperoxy pivalate, dioctanoyl peroxide, dilauroyl peroxide, 2,2'-azobis-(2,4-dimethylvaleronitrile), tert-butylazo-2-cyanobutane; dibenzoyl peroxide, tert-butyl per [oxy]-2-ethylhexanoate, tert-butyl per[oxy]maleate, 2,2-azobis(isobutyronitrile); bis(tert-butylperoxy)cyclohexane, tert-butylperoxyisopropyl carbonate, tert-butyl per [oxy]acetate; 2,2-bis(tert-butylperoxy)butane, dicumyl peroxide, di-tert-amyl peroxide, di-tert-butyl peroxide, pinane hydroperoxide, cumene hydroperoxide, and tert-butyl hydroperoxide; and t-butylperoxy pivalate and t-amylperoxy pivalate.

These polymerization initiators suitably are used in an amount of about 0.05 to 10% by weight of the monomer or monomers, and, preferably, about 0.1 to 5% by weight of the initiator is required.

A mixture of hydrogen peroxide and a metallic ion has been used previously as a free radical polymerization initiator in several polymerizations. However, this combination can be used in aqueous systems only.

Many polymerization processes require the presence of a protective colloid in the reaction system in order to prevent agglomeration of monomer during the process. However, such protective colloids often introduce a detrimental ingredient into the polymerization mixture, which is undesirable.

Shiraeff, in U.S. Pat. Nos. 3,376,110 and 3,480,557, reacted excess hydrogen peroxide and PVP in an aqueous solution of the components. The process involved mixing PVP and a large excess of aqueous $H_2O_2$, and evaporating the solution to dryness. Shiraeff stated that water could be tolerated in the product if it did not affect the solid dry characteristics of the complexes. The $H_2O_2$ content of the composition was given as being at least 2%, and preferably 4.5 to 70% by weight. Prolonged drying of the composition in an attempt to reduce the water content, however, resulted in considerable loss of $H_2O_2$. The product formed hard brittle, transparent, gummy, amorphous product of non-reproducible consistency; i.e. a variable $H_2O_2$ content ranging from about 3.20 to 18.07% by weight, depending upon the drying times; and a considerable amount of water.

The Shiraeff PVP—$H_2O_2$ material did not attain commercial success for any disclosed use because the product (1) was not a free-flowing powder; (2) its water and peroxide content varied widely; (3) it did not provide a consistent and reproducible product; and (4) the aqueous laboratory process could not be scaled up due to loss of $H_2O_2$ during drying.

Merianos, in U.S. Pat. Nos. 5,008,106 and 5,066,481, described processes for making stable, high purity, free-flowing, fine white powders of substantially anhydrous complexes of PVP and $H_2O_2$, in a defined molar ratio of constituents, e.g. 1:1, by reacting PVP and a solution of $H_2O_2$.

Biss, in U.S. Pat. No. 5,077,047 described another process for making the Merianos product in which a fluidized bed of PVP was contacted with an aqueous $H_2O_2$ solution. Both the Merianos and Biss methods provided free-flowing powders of PVP—$H_2O_2$ suitable for use herein.

Accordingly, it is an object of this invention to provide polymerization processes using a free radical polymerization initiator which is a mixture of a stable, high purity, free-flowing, fine white powder of a substantially anhydrous complex of PVP and $H_2O_2$ in a molar ratio of about 1:1, respectively, and a metallic ion, such as a transition metal ion.

A more particular object is to provide a process for polymerization of vinyl monomers such as vinylpyrrolidone.

A specific object herein is to provide polymerization processes wherein the free radical initiator can function in both aqueous and non-aqueous medium while supplying a protective colloid in situ to the polymerization system.

These and other objects and features of the invention will be made apparent from the following more detailed description of the invention.

SUMMARY OF THE INVENTION

A free radical initiated polymerization process is described herein in which at least one monomer is polymerized in the presence of a mixture of a stable, high purity, free-flowing, fine white powders of a substantially anhydrous complex of PVP and $H_2O_2$ in a molar ratio of about 1:1, respectively, and a transition metal ion, as the free radical initiator. Representative polymerizations using the initiator of the invention include the copolymerization of maleic anhydride and a $C_1$-$C_5$ alkyl vinyl ether, and the homopolymerization of vinylpyrrolidone.

DETAILED DESCRIPTION OF THE INVENTION

The free-flowing, 1:1 molar ratio PVP—$H_2O_2$ complexes used in the invention herein can be prepared by several methods. According to Merianos process of U.S. Pat. No. 5,008,106, PVP and anhydrous $H_2O_2$ are reacted in predetermined 1:1 molar ratio in suspension in an anhydrous organic solvent. The product is a stable. uniform, free-flowing, fine white powder which is isolated by filtration from the solvent.

In U.S. Pat. No. 5,066,481, water-insoluble PVP is suspended in anhydrous ethyl acetate into which an aqueous, concentrated $H_2O_2$ solution containing about 70 to 85% by weight $H_2O_2$ is slowly added, the amounts of PVP and $H_2O_2$ thereby being reacted corresponding substantially to the desired 1:1 molar ratio in the complex, at a temperature of about 0°–10° C., under agitation. The precipitate obtained is a uniform, free-flowing, fine white powder, which is filtered and dried.

In the Biss method, a fluidized bed of PVP powders maintained at a reaction temperature of from about ambient temperature to 60° C., preferably 35°–40° C., is contacted with finely divided droplets of a 30 to 85%, preferably 50–70%, by weight aqueous $H_2O_2$ solution. The feed rate for introduction of the $H_2O_2$ solution suitably is about 5–50 g/minute/kg PVP used.

The PVP polymeric starting materials used in the present invention are available commercially as a solid of varying molecular weight, water solubility or insolubility, and water content. Typical water-soluble PVP polymers are PVP K-15, PVP C-15, PVP K-29-32, PVP K-30, PVP K-90 and PVP K-120 (International Specialty Products), which contain less than 5% water. Crospovidone is an example of an available water-insoluble PVP material. Mixtures of water soluble and water-insoluble PVP also may be used. Preferably water-soluble PVP is used herein.

Representative polymerizations herein include vinyl polymerizations such as the homopolymerization of vinylpyrrolidone and the copolymerization of maleic anhydride and a $C_1$–$C_5$ alkyl vinyl ether. Preferably the homopolymerization of vinylpyrrolidone is carried out in aqueous solution and the copolymerization of maleic anhydride and alkyl vinyl ether is carried out in a non-aqueous solvent. The initiator herein preferably is a mixture of the free-flowing 1:1 PVP—$H_2O_2$ powder and a metallic ion, such as a transition metal ion, e.g. copper or cobalt ions, which are capable of accelerating the decomposition of the peroxide component of the complex to provide free radicals PVP thereby remains to function as a protective colloid in the polymerization.

The invention will now be described with reference to the following examples.

EXAMPLE 1

Preparation of Polyvinylpyrrolidone

A 2-liter reactor was provided with agitation, gas inlet, condenser, and thermocouple and was charged with 270 g. (2.3 moles) of non-stabilized vinylpyrrolidone monomer, buffered with 0.27 g. of tetrasodium pyrophosphate and 1,080 g. of deionized water. Then 0.10 g of copper sulfate was added. The reactor was swept clean of oxygen by admitting nitrogen gas through the inlet tube. Then the reactor was heated to 55° C. and 0.25 g. of finely-divided powders of 1:1 PVP—$H_2O_2$ was added. The reaction was carried out at 56°–59° C. for 5 hours. Then an additional 0.25 g. of PVP—$H_2O_2$ was added and the reaction was continued for 2 hours. At the end of the reaction period, the reaction product included 21% solids with a residual monomer content of only about 0.04%. The PVP polymer product in water was characterized by a K-value of 121; a Brookfield viscosity of 120,000 cps at 26° C. and excellent water dissolution.

EXAMPLE 2

Preparation of Copolymers of Maleic Acid and Methyl Vinyl Ether

A 1-liter pressure reactor was charged with 63.8 g. of methyl vinyl ether and 143 g. of acetone. A solution of 98 g. of maleic anhydride in 147 g. of acetone was prepared and charged into a syringe pump. The reactor was heated until the temperature of the charge reached 55° C. Then 0.94 g. of finely-divided powders of 1:1 PVP—$H_2O_2$ and 0.10 g of copper sulfate was introduced in 20 ml. of the maleic anhydride solution in one shot. Thereafter, the rest of the solution was fed into the reactor continuously over a 4-hour period. Afterwards, the reaction mixture was held at 55° C. for an hour and the reactor was cooled to 25°–30° C. Excess methyl vinyl ether was removed and collected. The reaction product was discharged as a solution of maleic anhydride-methyl vinyl ether copolymer in acetone.

In summary, the polymerization process of the invention can be carried out in an aqueous medium, where the PVP—$H_2O_2$ initiator is freely dissociated, or in a glycol or polar solvent, where the $H_2O_2$ is in equilibrium with the complex, or in less polar solvents, where the $H_2O_2$ is present in the complex itself. Moreover, no reaction occurs between $H_2O_2$ and PVP even at high polymerization temperatures. Furthermore, the residues formed by decomposition of $H_2O_2$ are water and oxygen, which are harmless species in the reaction mixture.

While the invention has been described with particular reference to certain embodiments thereof, it will be understood that changes and modifications may be made which are within the skill of the art. Accordingly, it is intended to be limited by the appended claims only, in which:

What is claimed is:

1. A polymerization process which comprises copolymerizing maleic anhydride and a $C_1$–$C_5$ alkyl vinyl ether at about 55°–85° C. in the presence of about 1–10% by weight of a free radical initiator mixture which is a stable, high purity, free-flowing, fine white powder of a substantially anhydrous complex of PVP and $H_2O_2$ in a molar ratio of about 1:1, and a transition metal ion, in acetone.

2. A polymerization process which comprises polymerizing vinylpyrrolidone in an aqueous medium at a reaction temperature of about 56°–59° C. in the presence of a free radical initiator mixture which is a stable, high purity, free-flowing, fine white powder of a substantially anhydrous complex of PVP and $H_2O_2$ in a molar ratio of about 1:1, and a transition metal ion, to form polyvinylpyrrolidone having a K-value of about 121; a Brookfield viscosity of about 120,000 cps at 26° C., a solids content of about 21%, and residual monomer content of only about 0.04%.

* * * * *